(12) United States Patent
Chan

(10) Patent No.: US 7,748,014 B2
(45) Date of Patent: *Jun. 29, 2010

(54) METHODS AND APPARATUS TO DETECT AN INTERNALLY GENERATED SIGNAL MODE OF A LOCAL MEDIA PLAYBACK DEVICE

(75) Inventor: Cheuk Wan Chan, Tarpon Springs, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/493,837

(22) Filed: Jun. 29, 2009

(65) Prior Publication Data

US 2009/0265730 A1    Oct. 22, 2009

Related U.S. Application Data

(63) Continuation of application No. 11/466,684, filed on Aug. 23, 2006, now Pat. No. 7,594,242, which is a continuation of application No. PCT/US2004/005304, filed on Feb. 23, 2004.

(51) Int. Cl.
    *H04H 60/32* (2008.01)
(52) U.S. Cl. ............................... 725/21; 725/9; 725/14; 725/15; 725/16; 725/17; 725/19; 725/20; 348/587; 348/592
(58) Field of Classification Search ............ 725/9, 725/14–17, 19–21; 348/587, 592
    See application file for complete search history.

(56) References Cited

U.S. PATENT DOCUMENTS

| 4,425,642 A | 1/1984 | Moses et al. |
| 4,574,304 A | 3/1986 | Watanabe et al. |
| 4,697,209 A | 9/1987 | Kiewit et al. |
| 4,764,808 A | 8/1988 | Solar |
| 4,821,178 A | 4/1989 | Levin et al. |
| 4,885,632 A | 12/1989 | Mabey et al. |
| 4,991,027 A | 2/1991 | Enoki |
| 5,142,690 A | 8/1992 | McMullan, Jr. et al. |
| 5,165,069 A | 11/1992 | Vitt et al. |

(Continued)

FOREIGN PATENT DOCUMENTS

CA    2290300 A1    11/1999

(Continued)

OTHER PUBLICATIONS

International Preliminary Report on Patentability issued in connection with International Patent Application No. PCT/US2004/005304, issued Mar. 3, 2009, 6 pages.

(Continued)

*Primary Examiner*—Jason P Salce
(74) *Attorney, Agent, or Firm*—Hanley, Flight & Zimmerman, LLC

(57) ABSTRACT

Methods and apparatus to detect an internally generated signal mode of a local media playback device are disclosed. A disclosed method comprises tuning a harmonic frequency of a chrominance signal output by a local media playback device, and determining that the local media playback device is in an internally generated signal mode if the measured harmonic frequency exceeds a predetermined threshold.

26 Claims, 9 Drawing Sheets

U.S. PATENT DOCUMENTS

| | | | |
|---|---|---|---|
| 5,225,902 | A | 7/1993 | McMullan, Jr. |
| 5,235,619 | A | 8/1993 | Beyers, II et al. |
| 5,298,982 | A | 3/1994 | Lagoni |
| 5,404,161 | A | 4/1995 | Douglass et al. |
| 5,437,050 | A | 7/1995 | Lamb et al. |
| 5,495,282 | A | 2/1996 | Mostafa et al. |
| 5,500,690 | A | 3/1996 | Vilard |
| 5,539,471 | A | 7/1996 | Myhrvold et al. |
| 5,583,784 | A | 12/1996 | Kapust et al. |
| 5,629,739 | A | 5/1997 | Dougherty |
| 5,630,011 | A | 5/1997 | Lim et al. |
| 5,666,168 | A | 9/1997 | Montgomery et al. |
| 5,737,025 | A | 4/1998 | Dougherty et al. |
| 5,737,026 | A | 4/1998 | Lu et al. |
| 5,929,920 | A | 7/1999 | Sizer, II |
| 5,999,689 | A | 12/1999 | Iggulden |
| 6,002,443 | A | 12/1999 | Iggulden |
| 6,058,191 | A | 5/2000 | Quan |
| 6,134,279 | A | 10/2000 | Soichi et al. |
| 6,297,858 | B1 | 10/2001 | Yang |
| 6,330,335 | B1 | 12/2001 | Rhoads |
| 6,343,181 | B1 | 1/2002 | Ikeda et al. |
| 6,504,579 | B1 | 1/2003 | Scherrer |
| 6,513,161 | B2 | 1/2003 | Wheeler et al. |
| 6,523,175 | B1 | 2/2003 | Chan |
| 6,675,383 | B1 | 1/2004 | Wheeler et al. |
| 7,030,937 | B2 | 4/2006 | Yamamoto |
| 2002/0026635 | A1 | 2/2002 | Wheeler et al. |
| 2002/0154885 | A1 | 10/2002 | Covell et al. |
| 2004/0068737 | A1 | 4/2004 | Itoh et al. |
| 2004/0088721 | A1 | 5/2004 | Wheeler et al. |
| 2005/0172312 | A1 | 8/2005 | Lienhart et al. |
| 2006/0187358 | A1 | 8/2006 | Lienhart et al. |
| 2006/0195857 | A1 | 8/2006 | Wheeler et al. |
| 2006/0195860 | A1 | 8/2006 | Eldering et al. |
| 2006/0248569 | A1 | 11/2006 | Lienhart et al. |

FOREIGN PATENT DOCUMENTS

| | | |
|---|---|---|
| EP | 0161512 A1 | 11/1985 |
| EP | 0624866 A2 | 11/1994 |
| WO | 9115062 | 10/1991 |
| WO | 9115063 | 10/1991 |
| WO | 9115064 | 10/1991 |
| WO | 9115065 | 10/1991 |
| WO | 9217010 | 10/1992 |
| WO | 2004051997 | 6/2004 |
| WO | 2004073217 | 8/2004 |
| WO | 2005079457 | 9/2005 |
| WO | 2005084186 | 9/2005 |
| WO | 2006020560 | 2/2006 |

OTHER PUBLICATIONS

Written Opinion of the International Searching Authority, issued in connection with International Patent Application No. PCT/US2004/005304, mailed Apr. 1, 2008, completed Mar. 25, 2008, 5 pages.

International Search Report, issued in connection with International Patent Application No. PCT/US2004/005304, mailed Apr. 1, 2008, completed Nov. 14, 2004, 2 pages.

Notice of Allowance issued in connection with U.S. Appl. No. 11/466,684, mailed Jun. 9, 2009, 10 pages.

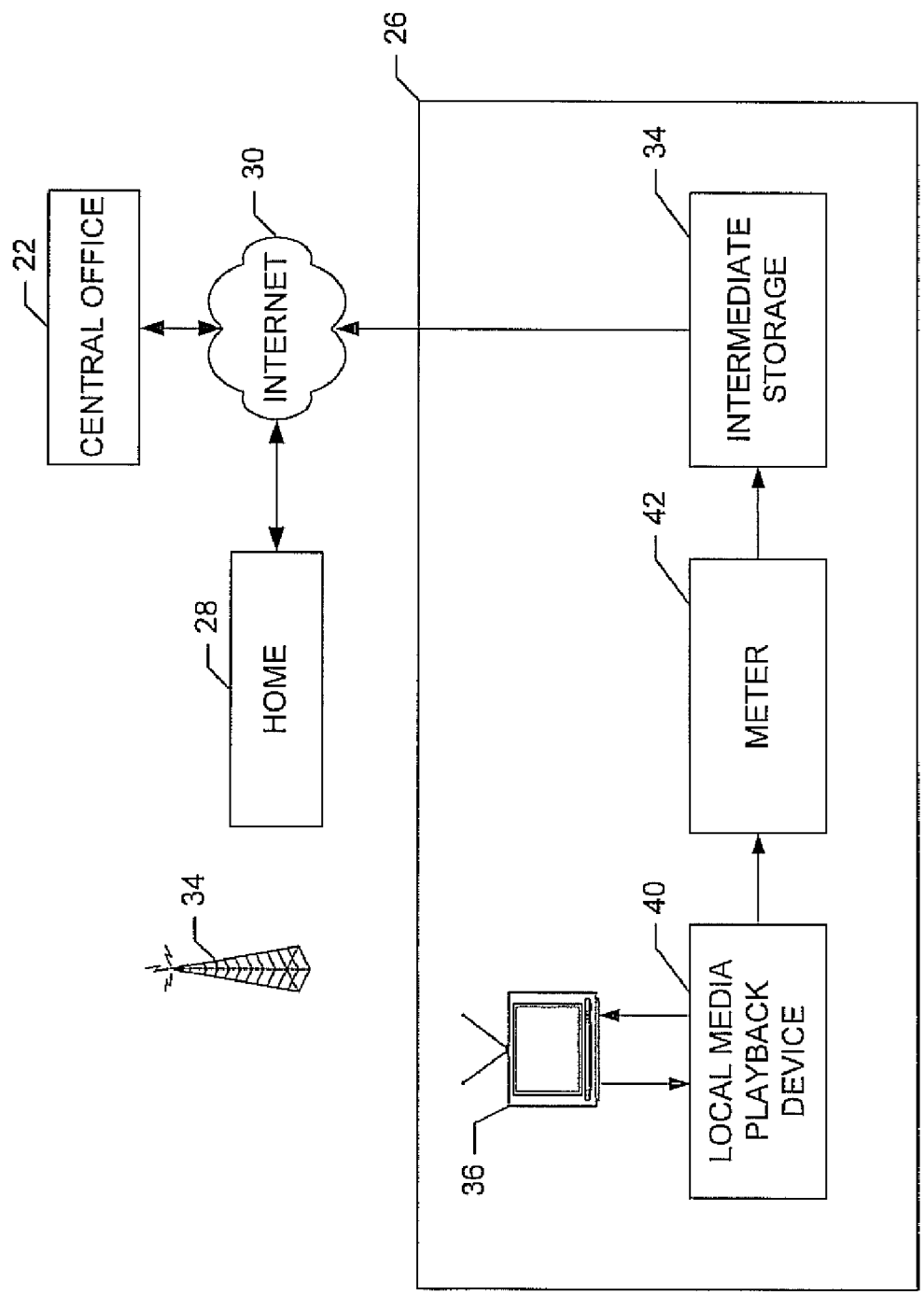

METHODS AND APPARATUS TO DETECT AN INTERNALLY GENERATED SIGNAL MODE OF A LOCAL MEDIA PLAYBACK DEVICE

RELATED APPLICATIONS

This patent arises from a continuation of U.S. patent application Ser. No. 11/466,684, filed Aug. 23, 2006, now U.S. Pat. No. 7,594,242, which is a continuation of International Patent Application Serial No. PCT/US2004/005304, filed Feb. 23, 2004, both of which are hereby incorporated by reference in their entireties.

FIELD OF THE DISCLOSURE

This disclosure relates generally to audience measurement, and, more particularly, to methods and apparatus to detect an internally generated signal mode of a local media playback device.

BACKGROUND

Companies that rely on broadcast video and/or audio programs for revenue, such as advertisers, television networks and content providers, wish to know the size and demographic composition of the audience(s) that consume their program(s). Audience measurement companies typically address this need by measuring the demographic composition of a set of statistically selected households and the program consumption habits of the member(s) of those households. For example, audience measurement companies may collect viewing data on a selected household by monitoring the content displayed on that household's television(s) and by identifying which household member(s) are watching that content.

Gathering this audience measurement data has become more difficult as local media playback devices (such as video cassette recorders, digital video recorders, and personal video recorders) have made time shifted viewing of broadcast and other programs possible. For example, prior to the advent of these local media playback devices, televisions were used solely to view tuned broadcast programs. As such, an audience measurement company could monitor all of the television viewing by monitoring the channel to which the television was tuned. However, when a local media playback device is employed, the tuned channel of the television may not be indicative of the program being viewed by the audience. For instance, a television tuned to a particular channel (e.g., 3 or 4) may not be displaying a program it has tuned, but may instead be displaying a program tuned by the local media playback device on a completely difference channel, a recorded program played from a tape, a digital versatile disk (DVD) or hard disk drive, or a program played from another source. Thus, the presence of a local media playback device complicates the audience monitoring process.

A number of different techniques have been proposed for performing audience measurement in the presence of these local media playback devices. Some of these methods seek to detect the presence of blue screen signals which are internally generated by the local media playback devices in an effort to determine the source of the programming displayed on a television at a given time. As used herein, a blue screen signal is any signal generated by a local media playback device which, when supplied to a television, causes the television to display a blue background. A blue screen signal may or may not include information that causes a graphic foreground to be displayed against the blue background.

Local media playback devices generate blue screen signals in a variety of instances. For example, blue screen signals may be displayed: (a) when the local media playback device is displaying a menu to the user or otherwise receiving inputs from a user, (b) during the period before and/or after the local media playback device supplies recorded video signals to a television, (c) when the device is initially powered on and the user has not yet selected a mode of operation, and (d) when a selected source is not providing an input video signal.

An example local media playback device, (in this instance, a vide cassette recorder (VCR)), is shown in FIG. 1. In the illustrated example, the VCR has two input ports, namely, an antenna in port 2 and an audio/video (a/v) line in port 4. The antenna in port 2 is intended to be coupled to an external antenna and/or to an external tuner such as a television. The a/v line in port 4 is intended to be coupled to other sources such as a camcorder, another VCR, a DVD player, a digital video recorder (DVR), a video game, or a personal video recorder (PVR). The illustrated VCR also has two output ports, namely, a radio frequency (RF) output port 6 and an audio/video (a/v) line out port 8, both of which are intended to be coupled to an external display device such as a television or to another type of device (e.g., to another VCR). The RF output port 6 is coupled to an RF modulator 10 which functions in the conventional manner to modulate input signals to produce RF output signals at a predetermined frequency (e.g., at channel 3 or 4).

To enable the VCR to tune to broadcast programs, the illustrated VCR is provided with a conventional RF tuner 12. The RF tuner 12 is coupled to the antenna in port 2 to enable attachment of an antenna to the tuner 12.

To enable the playback of recorded media, the VCR of FIG. 1 is also provided with a conventional tape playback mechanism 14. This playback mechanism 14 typically includes a recording mechanism to enable recordation of programs tuned by the tuner 12 or otherwise input via one of the input ports 2, 4.

The VCR of FIG. 1 has a number of output modes. For example, it may simply pass a tuned broadcast program received from an external tuner such as a television tuner via, for example, the antenna in port 2 to the RF modulator 10 via the tuner bypass switch 16. Alternatively, the mode switch 18 may be activated in response to a user command to deliver the signal tuned by the internal tuner 12 of the VCR to the output ports 6, 8. In other operating modes, the mode switch 22 may respond to a user command by coupling the signal generated by the tape playback device 14 or a signal input by the a/v line in port 4 to the output ports 6, 8.

The illustrated VCR is further provided with a blue screen signal generator 20. The blue screen signal generator 20 may output a blank blue screen and/or a blue screen with text or other characters. When appropriate, the VCR control logic (not shown) cause the mode switch 18 to couple the signal generated by the blue screen signal generator 20 to the output ports 6, 8.

Although the presence of a blue screen signal alone does not precisely define the operating mode of the local media playback device, it does indicate that a local media playback device is operational. Therefore, it is desirable to detect the presence of a blue screen signal.

BRIEF DESCRIPTION OF THE DRAWINGS

FIG. 2 is a schematic illustration of an example local media mode meter to detect an internally generated signal mode of a local media playback device shown in an example environment of use.

DETAILED DESCRIPTION

Figure 1:
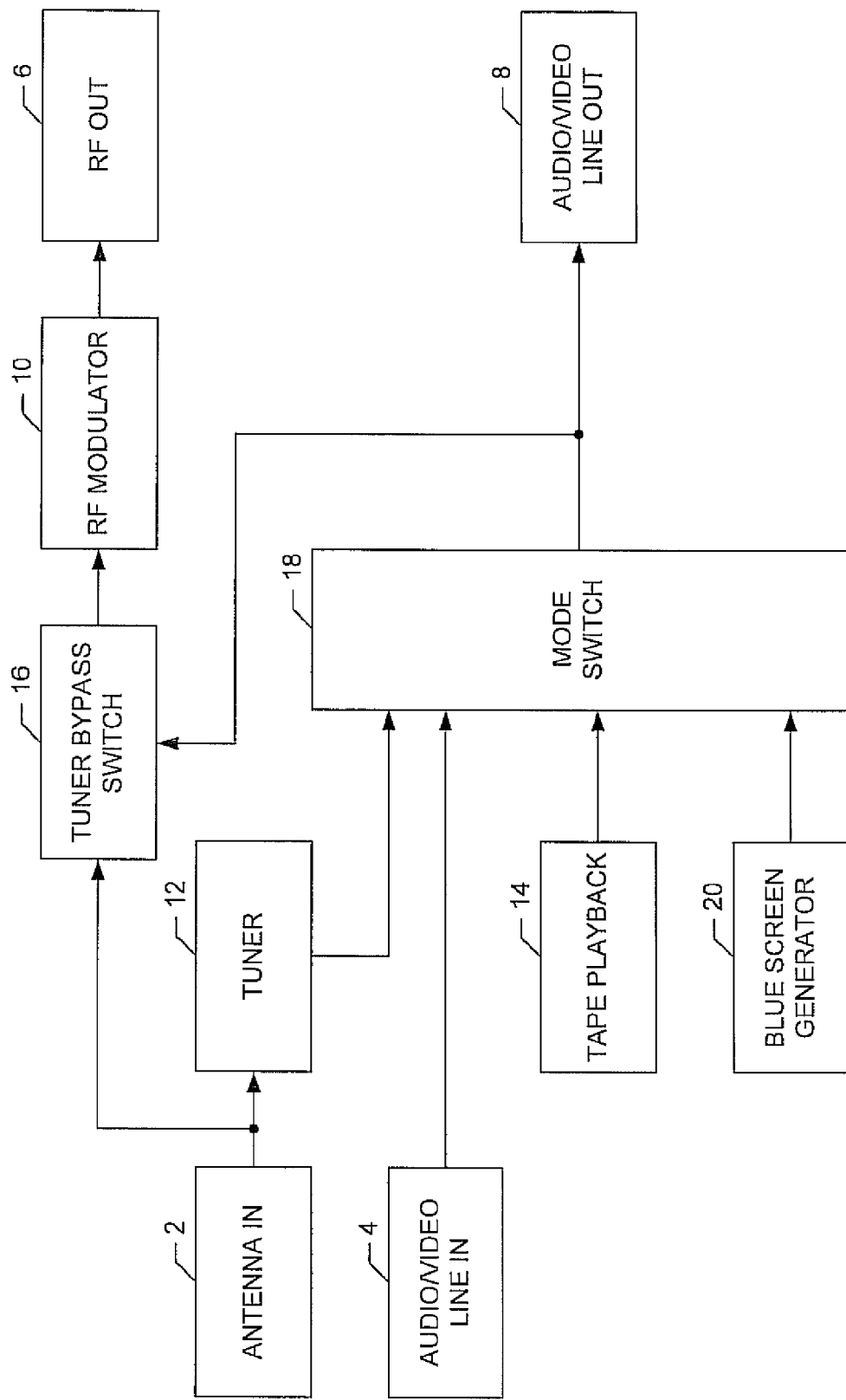
FIG. 1 is a schematic illustration of an example prior art local media playback device, namely, a video cassette recorder.

FIG. 2 is a schematic illustration of an example system to develop audience measurement statistics. In the illustrated example, a central data collection office 22 is connected to a plurality of statistically selected households 26, 28 via a network 30. The monitored home sites 26, 28 are provided with one or more sensors and/or other passive and/or active data collection engines to gather data identifying the programs consumed by the members of the monitored households 26, 28, and the household members that consumed those programs. The data collected in the monitored home sites 26, 28 may be locally stored in an intermediate storage device 34 such as a hard disk drive. The stored data is exported periodically or continuously to the central office 22 via the network 30. The data collection office 22 includes one or more computers that analyze the data received from the monitored home sites 26, 28 to develop meaningful audience measurement statistics such as, for example, television ratings, audience share measurements, etc. The network 30 can be implemented by any desired network such as, for example, the Internet, the public switched telephone network, a wireless connection, dedicated connections, etc.

In the illustrated example, the home sites 26, 28 receive video and/or audio programs broadcast from one or more broadcasting systems 34. Although FIG. 2 schematically illustrates the broadcasting systems 34 by a radio tower, persons of ordinary skill in the art will readily appreciate that the broadcasting systems may be implemented by one or more of a terrestrial broadcasting system, a cable broadcasting system, a satellite broadcasting system, the Internet, or any other broadcasting system.

The broadcast programs may include primary content (e.g., entertainment, informational and/or educational content such as movies, television network programs, sporting events, news, etc.) and may also include secondary content (e.g., commercials) interspersed within the primary content. For simplicity of discussion, in the following it will be assumed that the broadcast program contains a television program (i.e., primary content) interspersed with commercials (i.e., secondary content) advertising products of a sponsor of the television program.

The home sites 26, 28 may include any number of information presenting devices 36 such as a television, a computer, a radio, a stereo, an Internet appliance, etc. The home sites 26, 28 may also include one or more local media playback devices 40 such as an analog recording device (e.g., a video cassette recorder (VCR)), a digital recording device such as a digital video recorder, a personal video recorder, a computer, etc, and/or an analog or digital playback device such as a set top box, a DVD player, a video game, etc. Each of the home sites 26, 28 includes a local media mode meter 42 which is coupled to the local media playback device 40 to detect an internally generated signal mode (e.g., a blue screen generation mode) of the local media playback device 40. The local media mode meter 42 cooperates with one or more other sensors and/or other passive and/or active data collection engines to collect audience measurement data regarding the use of the local media playback device. Because the structure and operation of the other data collection engines are not germane to the present disclosure, they are not discussed in further detail here. However, persons of ordinary skill in the art which may be interested in the types of data collection engines that may be used with the meter 42 are referred to PCT application serial no. PCT/US03/04030, which is hereby incorporated by reference, for a discussion of some example data collection engines.

As mentioned above, the data collected and/or analyzed by the local media mode meter 42 and/or the other data collection engines (not shown) may be periodically exported to the central office 22 via the network 30 for further analysis and/or distribution.

The local media mode meter 42 is structured to detect when the local media playback device 40 enters a mode wherein it is outputting an internally generated signal. In the illustrated example, the internally generated signal is a blue screen signal which may or may not be output with overlying text or other characters (e.g., a menu). To this end, the local media mode meter 42 receives a signal output by the local media playback device 40 and attempts to detect a characteristic unique to a locally generated blue screen signal in the received signal. As explained in detail below, the characteristic the local media mode meter 42 of the illustrated example attempts to detect is in an out-of-band portion of the chrominance signal received from the local media play back device 40.

By way of background, it is known to persons of ordinary skill in the art that NTSC broadcast signals include a chrominance signal having a fundamental frequency of 3.5795 MHz. The bandwidth of a tuned broadcast signal under the NTSC standard is 4.5 MHz. However, the typical NTSC broadcast signal will exhibit harmonics to the chrominance signal at frequencies much higher than the video bandwidth. These harmonics are attenuated. For example, the signal strengths of the harmonics of a broadcast chrominance signal are typically 30 to 50 dB below the signal strength of the fundamental frequency of the broadcast chrominance signal.

The inventor of the present invention has discovered that the blue screen signals output by local media playback devices also exhibit a trail of harmonic frequencies to the fundamental chrominance frequency of the internally generated blue screen signal. However, to reduce the costs of the local media playback devices 40, the local media playback devices 40 are not provided with expensive circuitry to suppress these harmonic frequencies. In contrast, to avoid interference with signals broadcast in adjacent frequencies, broadcast signals are processed to suppress the strength of harmonic signals that are outside the video bandwidth of the broadcast signal. As a result, the trail of harmonic frequencies of a chrominance signal that is internally generated by a local media playback device 40 (e.g., the chrominance signal of a blue screen signal) includes harmonics with significantly higher signal strengths than the corresponding frequencies in a broadcast signal. Specifically, the blue screen signals generated by local media playback devices include harmonic frequencies that are 10 to 30 dB higher than the corresponding harmonics of a broadcast signal.

Figure 3A:
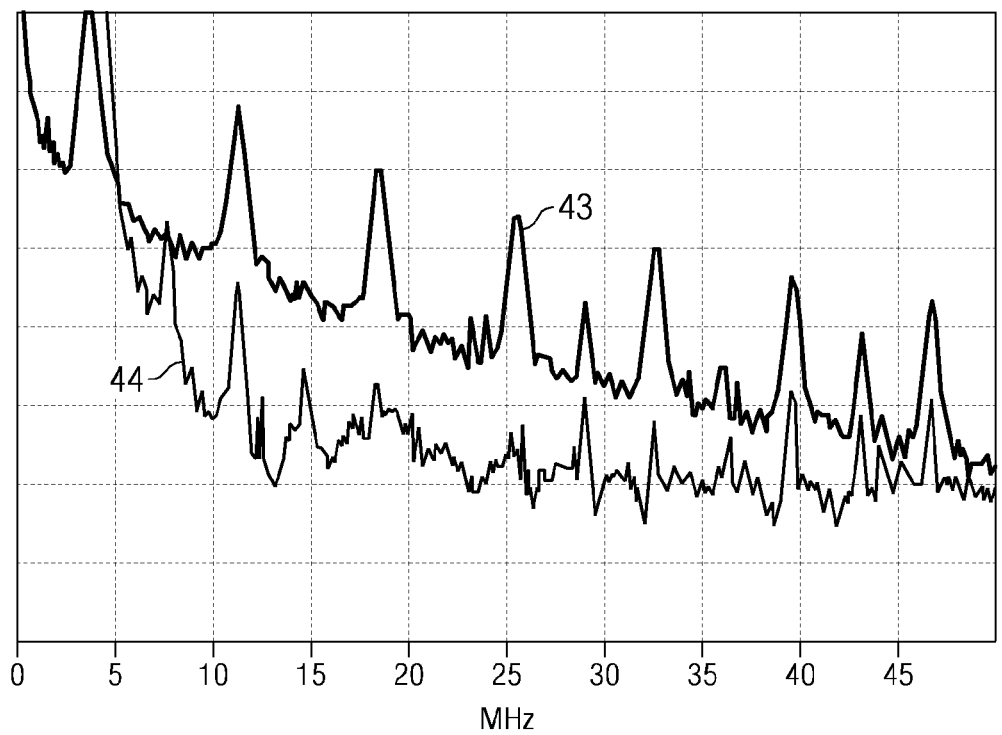
FIG. 3A is a graph illustrating an example harmonic frequency trail of the chrominance signal of a first example VCR and of the chrominance signal of an example television.
Figure 3B:
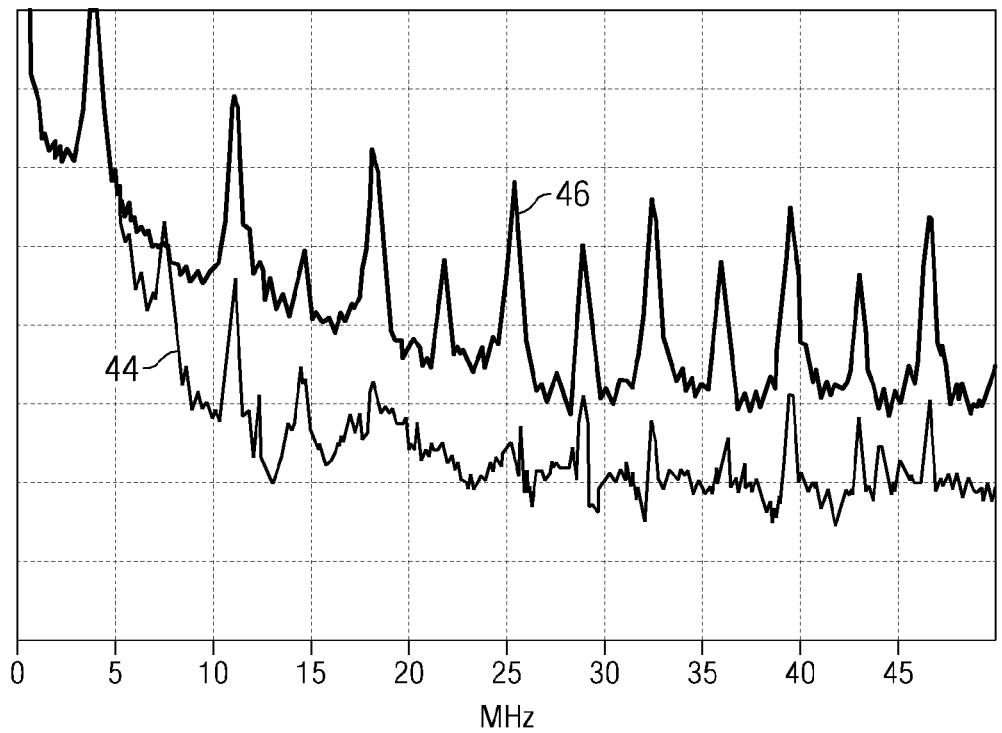
FIG. 3B is a graph illustrating an example harmonic frequency trail of the chrominance signal of a second example VCR and of the chrominance signal of an example television.

FIGS. 3A and 3B illustrate this point. FIG. 3A is a graph illustrating an example harmonic frequency trail 43 of the chrominance signal of a first example VCR and of an example harmonic frequency trail 44 of the chrominance signal of an example television. FIG. 3B is a graph illustrating an example harmonic frequency trail 46 of the chrominance signal of a second example VCR and an example harmonic frequency trail 44 of the chrominance signal of the same example television. As shown in those graphs, the harmonic trails of the chrominance signals that are internally generated by the VCRs include several peaks where the signal strength is significantly higher than the signal strength of the corresponding portion of the harmonic trail of the broadcast chrominance signal. Experiments have shown that known VCRs that are presently commercially available in the United States exhibit at least three such peaks in the harmonic frequency trails of the chrominance signals for their internally generated blue screen signals. Tests have also shown that these peaks frequently occur between the fifth and the thirteenth harmonic frequencies. In some tested VCRs, the fifth, seventh and eleventh harmonic frequencies are particularly large relative to the same frequencies in the harmonic trail of a broadcast NTSC signal.

The local media mode meter 42 takes advantage of this difference by tuning one or more of the harmonic frequencies expected for the blue screen signal of the particular model of local media playback device 40 being monitored and comparing the tuned frequenc(ies) to corresponding thresholds. When the tuned frequenc(ies) exceed their corresponding threshold(s), the local media mode meter 42 concludes that the local media playback device 40 is in an internally generated signal mode (e.g., that a blue screen signal is being generated). As a result, the local media mode meter 42 creates and stores a time-stamped record indicating that the monitored local media playback device 40 was in a locally generated signal mode at the detected time.

Figure 4:
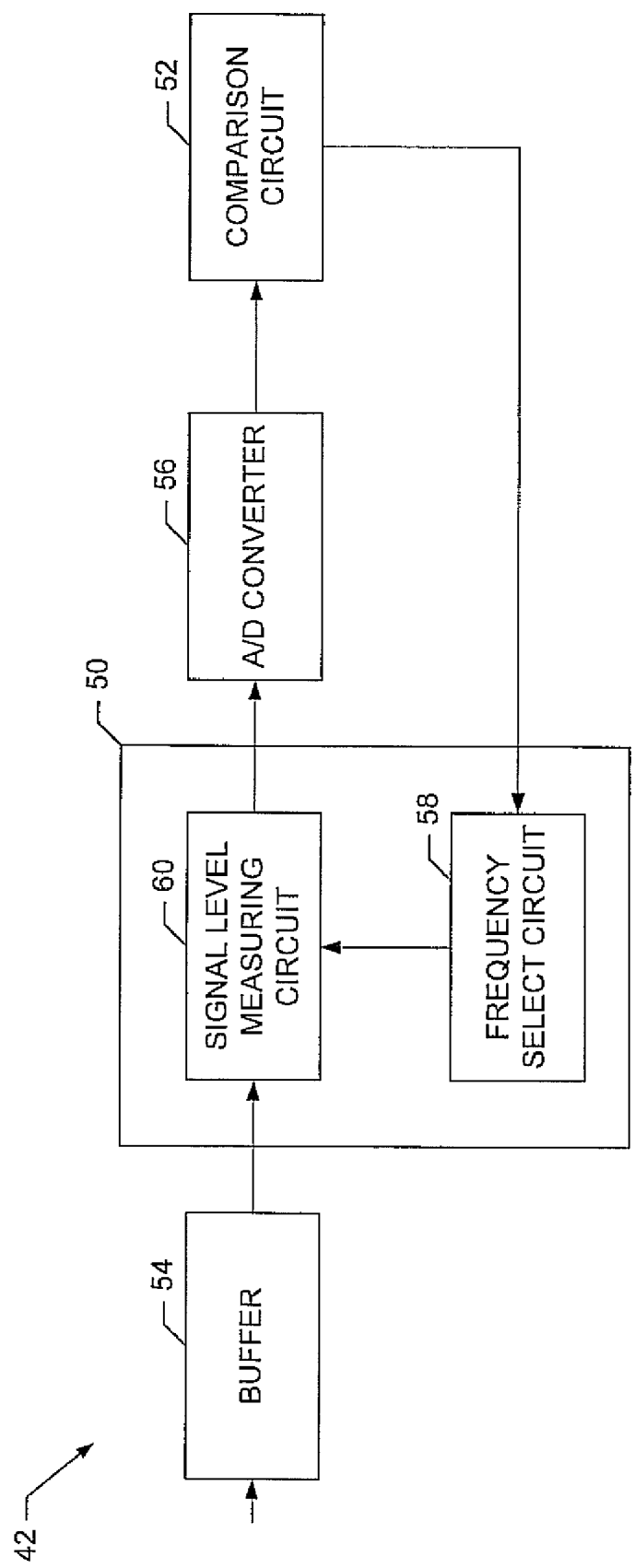
FIG. 4 is a schematic illustration of the example local media mode meter of FIG. 2.

An example local media mode meter 42 is shown in FIG. 4. In the example of FIG. 4, the primary components of the meter 42 are an RF tuner 50 to tune a signal output by the local media playback device 40 and a comparison circuit 52 to attempt to detect a characteristic unique to a blue screen video signal in an out-of-band portion of the signal output by the local media playback device 40 (i.e., in the portion of the signal tuned by the tuner 50). Additional components of the local media mode meter 42 include a conventional buffer 54 to tap into the signal output by the local media playback device 40 and an analog-to-digital converter 56 to convert the analog signal tuned by the tuner 50 into a digital signal for processing by the comparison circuit 52. Of course, if the comparison circuit 52 is able to process analog signals, the analog-to-digital converter 56 may be eliminated.

In the illustrated example, the tuner 50 is provided with a frequency select circuit 58 and a signal level measuring circuit 60. As shown in FIG. 4, the frequency select circuit 58 is responsive to control signals from the comparison circuit 52 to select the frequency tuned by the tuner 50. The tuner 50 tunes to a harmonic frequency (chosen by the comparison circuit) in the out-of-band portion of the signal output by the local media playback device 40.

The signal level measuring circuit 60 develops a signal indicative of the magnitude of the signal output by the local media playback device 40 at the harmonic frequency specified by the frequency select circuit 58. After being digitized by the analog-to-digital converter, the tuned harmonic frequency is passed from the tuner 50 to the comparison circuit 52. The comparison circuit 52 compares the magnitude of the tuned harmonic frequency to a threshold selected for the corresponding harmonic frequency (i.e., a threshold that a locally generated blue screen signal will exceed at the corresponding frequency, but which ordinarily will not be exceeded by a broadcast signal at the same frequency). If the threshold is exceeded, then the comparison circuit 52 drives the frequency select circuit 58 to cause the tuner 50 to tune to another harmonic frequency in the signal output by the local media playback device 40. The signal level measuring circuit 60 responds by outputting a signal representative of the magnitude of the newly tuned harmonic frequency. The comparison circuit 52 then compares the magnitude of this new frequency to a threshold appropriate for the tuned frequency (i.e., a threshold that a locally generated blue screen signal will exceed, but a broadcast signal will not exceed at the corresponding frequency). Typically, the thresholds for different harmonic frequencies will be different from one another, since different signal strengths will typically be expected at different harmonic frequencies as shown in FIGS. 3A and 3B. However, two or more of the thresholds may possibly be substantially identical.

As explained above, the illustrated tuner 50 and comparison circuit 52 cooperate to sequentially tune to predetermined ones (e.g., first, second, and third ones) of the harmonic frequencies of the chrominance signal output by the local media playback device 40. The predetermined frequencies are selected to correspond to harmonic frequencies that exhibit peaks when the local media playback device 40 is outputting a blue screen signal. For example, the illustrated tuner 50 may sequentially tune the fifth, seventh and eleventh harmonic frequencies of the chrominance signal output by the local media playback device 40 if an internally generated signal output by the local media playback device 40 exhibits large differences from a broadcast signal at those harmonic frequencies.

If each of the measured harmonic frequencies exceeds its corresponding threshold, the comparison circuit determines that the signal output by the local media playback device 40 is an internally generated signal (e.g., a blue screen signal). As a result, the local media mode meter 42 stores a time-stamped record indicating that the local media playback device 40 was in an internally generated signal mode at the corresponding time and date.

Although, in the example given above, the local media mode meter 42 only identifies the local media playback device 40 as being in a locally generated signal mode (e.g., a blue screen mode) if all of the thresholds are exceeded, persons of ordinary skill in the art will readily appreciate that less stringent standards might also be appropriate. For example, it might be appropriate to declare the local media playback device 40 to be in a locally generated signal mode if the meter 42 determines that less than all of the tested harmonic frequencies exceed their corresponding thresholds (e.g., two out of three frequencies exceed their thresholds). Also, although the above example tests the strength of three harmonic frequencies, other numbers of frequencies (e.g., one, two, four, etc.) may alternatively be tested.

Figure 5:
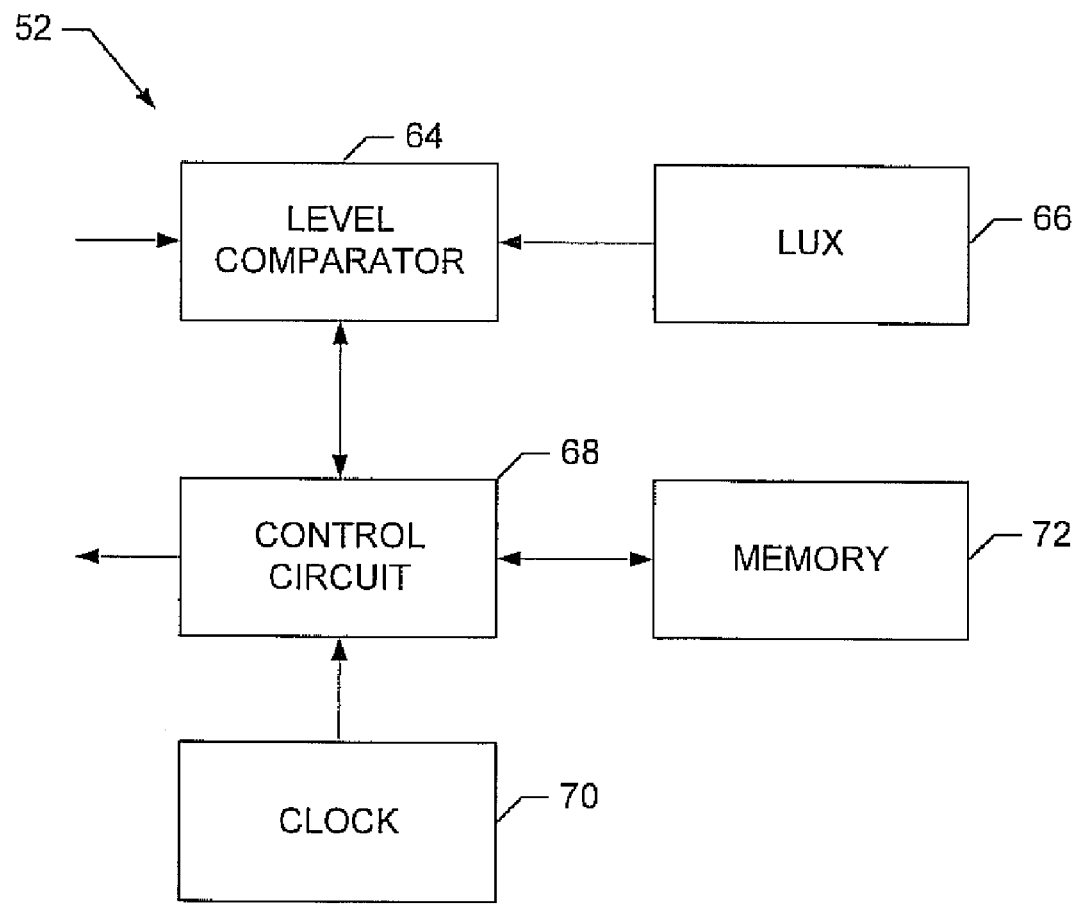
FIG. 5 is a schematic illustration of the example comparison circuit of FIG. 4.

An example comparison circuit 52 is shown in greater detail in FIG. 5. In the example of FIG. 5, the comparison circuit 52 includes a level comparator 64 to compare the magnitude of the tuned harmonic frequency to the corresponding threshold. The thresholds employed by the level comparator 64 may be stored in a look-up table 66. The look-up table 66 may include, for example, the harmonic frequencies and the corresponding thresholds to be used in testing those frequencies for one or more models of local media playback devices 40. Alternatively, the thresholds may be determined in a calibration process as explained below in connection with FIGS. 8A-8B.

The illustrated comparison circuit 52 is further provided with a control circuit 68. The control circuit 68 outputs a signal indicative of the next frequency to be tuned to the frequency select circuit 58. As noted above, the frequencies to be tuned may be specified in the look-up table 66 or stored in a memory 72 as a result of a calibration process, so the control circuit may simply select and output the correct frequency from the table 66 or the memory 72. Further, when the level comparator 64 has examined all of the harmonic frequencies to be tested and found that the magnitude of each of those frequencies exceeds its corresponding threshold, the control circuit 68 cooperates with a clock 70 to create a time-stamped record indicating that the local media playback device 40 was in an internally generated signal mode (e.g., a blue screen mode) at the corresponding time. The time-stamped record is written to the memory 72 and may be subsequently exported to a central office 24 as explained above.

Figure 6:
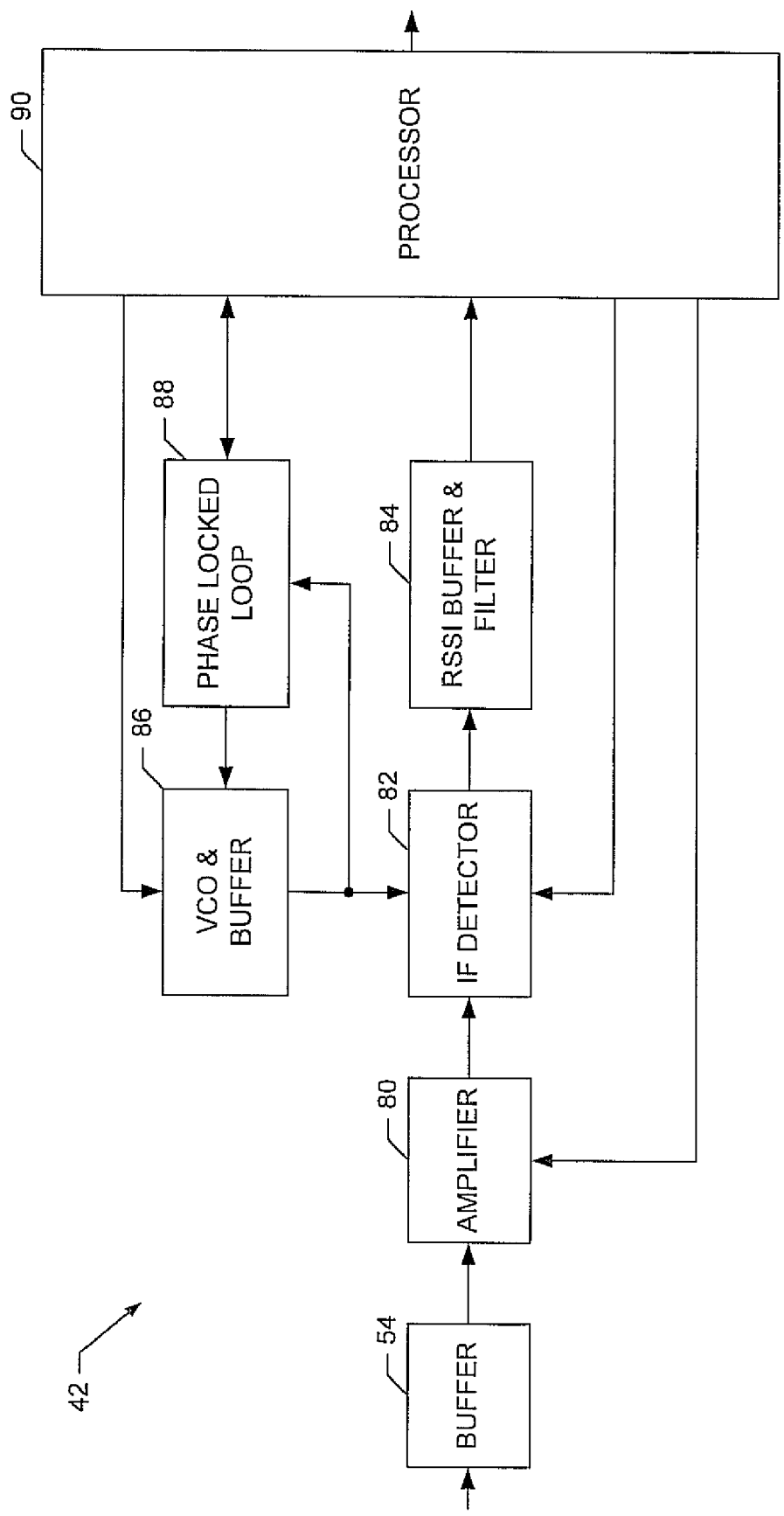
FIG. 6 is a circuit diagram illustrating an example implementation of the local media mode meter of FIGS. 4 and 5.

A preferred manner of implementing the local media mode meter 42 is shown in FIG. 6. In the example of FIG. 6, the signal level measuring circuit 60 is implemented by a low noise amplifier 80, an intermediate frequency detector 82, and a received signal strength indicator and filter 84. The frequency select circuit 58 of FIG. 6 is implemented by a voltage controlled oscillator 86 and a phase locked loop 88. The analog-to-digital converter 56 and the comparison circuit 52 of FIG. 6 are implemented by a processor 90 with analog-to-digital converter inputs. In a preferred implementation, the amplifier 80 is implemented by the amplifier sold by Phillips Electronics under part number BGA2001, the IF detector 82 is implemented by the mixer/IF amplifier sold by Phillips Electronics under part number SA676, the RSSI buffer and filter is implemented by the operational amplifier sold by Analog Devices under part number OP275, the VCO 86 is implemented by the RF amplifier sold by Phillips Electronics under part number BFG67 and the tuning diode sold by Toshiba under part number 1SV324, the phase locked loop 88 is implemented by the phase locked loop synthesizer sold by National Semiconductor under part number LMX2306, and the processor 90 is implemented by the microcontroller with A/D inputs sold by Microchip under part number PIC18F448.

Figure 7:
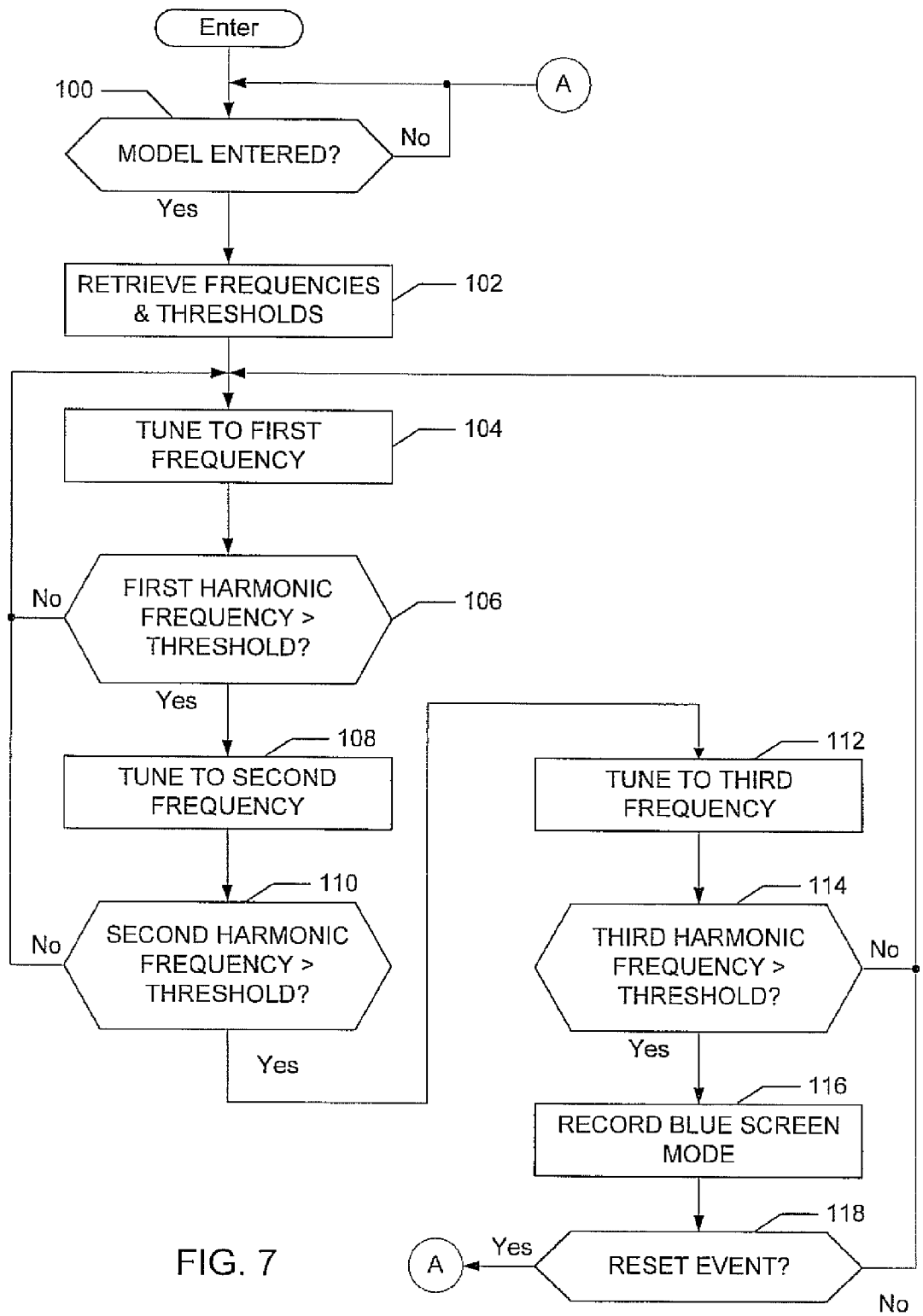
FIG. 7 is a flowchart representative of machine readable instructions which may be executed by the processor of FIG. 6 to implement the local media mode meter of FIGS. 4 and 5.

A flowchart representative of example machine readable instructions which may be executed by the processor 90 to implement the local media mode meter 42 of FIGS. 4-6 is shown in FIG. 7. In this example, the machine readable instructions comprise a program for execution by the processor 90. The program may be embodied in software stored on a tangible medium such as a CD-ROM, a floppy disk, a hard drive, a digital versatile disk (DVD), or a memory associated with the processor 90, but persons of ordinary skill in the art will readily appreciate that the entire program and/or parts thereof could alternatively be executed by a device other than the processor 90 and/or embodied in firmware or dedicated hardware in a well known manner. Further, although the example program is described with reference to the flowchart illustrated in FIG. 7, persons of ordinary skill in the art will readily appreciate that many other methods of implementing the example local media mode meter 42 may alternatively be used. For example, the order of execution of the blocks may be changed, and/or some of the blocks described may be changed, eliminated, or combined.

The program of FIG. 7 begins when a user identifies the model or type of local media playback device 40 to be monitored (block 100). As mentioned above, different models of local media playback devices (e.g., different models of VCRs) typically exhibit different trails of harmonic frequencies (compare FIGS. 3A and 3B). As such, the harmonic frequencies to test and the thresholds to use for those frequencies will typically differ from model to model.

Figure 8A:
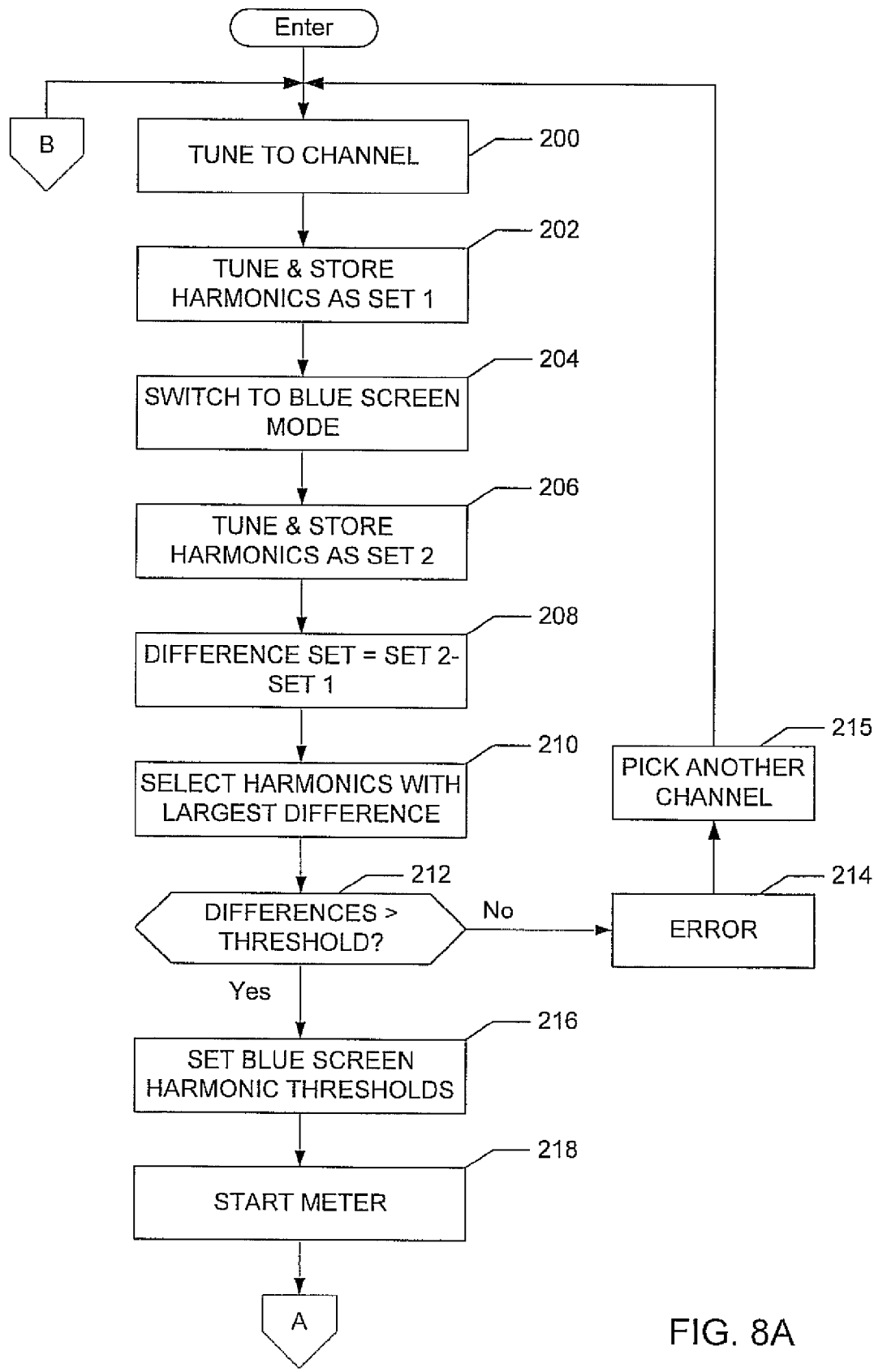
FIGS. 8A and 8B are a flowchart illustrating an example method of calibrating the local media mode meter of FIGS. 4-6 to meter an example local media playback device.
Figure 8B:
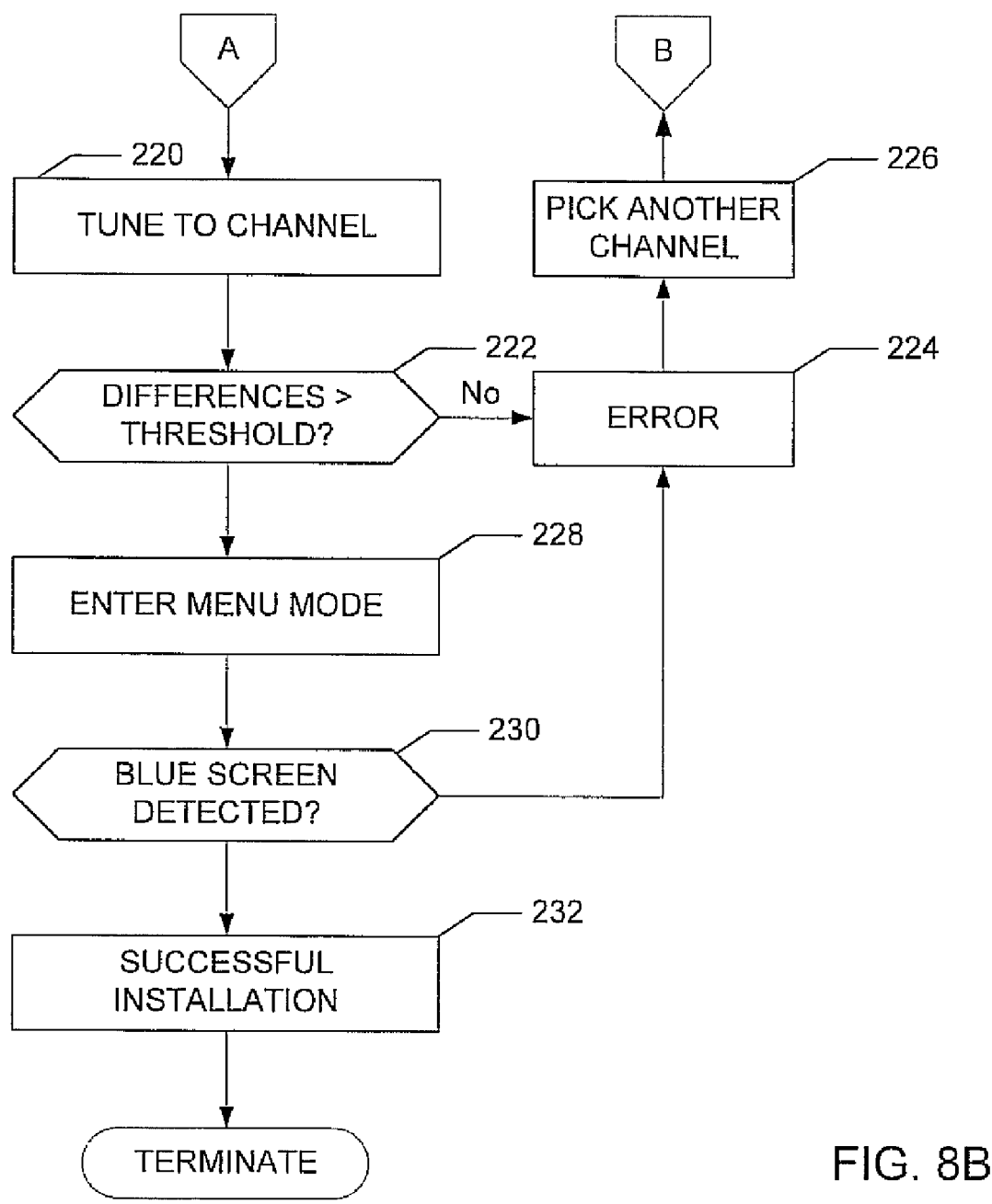

After the model number is entered (block 100), the processor retrieves the frequencies and threshold for the particular model from, for example, the look-up table 66 (block 102). (If a calibration process such as that explained below in connection with FIGS. 8A-8B is employed, block 100 may be eliminated and replaced with the process of FIGS. 8A-8B).

Irrespective of how the thresholds are identified, the processor 90 outputs the first harmonic frequency to test to the VCO and buffer 86. After a delay sufficient to permit the feedback loop containing the VCO 86 and the phase locked loop 88 to stabilize, the processor 90 causes the IF detector 82 to pass the tuned harmonic frequency to the RSSI buffer and filter 84 (block 104). The output of the RSSI buffer and filter 84 is an analog signal representative of the magnitude of the output of the local media playback device 40 at the tuned harmonic frequency. The output of the RSSI buffer and filter 84 is, thus, input to the processor 90 where it is digitized and compared to the threshold associated with the tuned harmonic frequency (block 106).

If the magnitude of the tuned harmonic frequency does not exceed the threshold (block 106), the local media playback device 40 is not in an internally generated signal mode (e.g., is not outputting a blue screen signal) and control returns to block 104. Otherwise, the local media playback device 40 may be in an internally generated signal mode (e.g., outputting a blue screen signal) and control advances to block 108.

At block 108 the processor 90 outputs the second harmonic frequency to test to the VCO and buffer 86. After a delay sufficient to permit the feedback loop containing the VCO 86 and the phase locked loop 88 to stabilize, the processor 90 causes the IF detector 82 to pass the second tuned harmonic frequency to the RSSI buffer and filter 84 (block 108). The output of the RSSI buffer and filter 84 is, thus, input to the processor 90 where it is digitized and compared to the threshold associated with the second tuned harmonic frequency (block 110).

If the magnitude of the second tuned harmonic frequency does not exceed the threshold (block 110), the local media playback device 40 is not in an internally generated signal mode (e.g., is not outputting a blue screen signal) and control returns to block 104. Otherwise, the local media playback device 40 may be in an internally generated signal mode (e.g., outputting a blue screen signal) and control advances to block 112.

At block 112 the processor 90 outputs the third harmonic frequency to test to the VCO and buffer 86. After a delay sufficient to permit the feedback loop containing the VCO 86 and the phase locked loop 88 to stabilize, the processor 90 causes the IF detector 82 to pass the third tuned harmonic frequency to the RSSI buffer and filter 84 (block 112). The output of the RSSI buffer and filter 84 is, thus, input to the processor 90 where it is digitized and compared to the threshold associated with the third tuned harmonic frequency (block 114).

If the magnitude of the third tuned harmonic frequency does not exceed the threshold (block 114), the local media playback device 40 is not in an internally generated signal mode (e.g., is not outputting a blue screen signal) and control returns to block 104. Otherwise, the local media playback device 40 is in an internally generated signal mode (e.g., outputting a blue screen signal) and control advances to block 116.

At block 116, the processor 90 creates and stores a record indicating that the local media playback device 40 was in an internally generated signal mode (e.g., outputting a blue screen) at the time indicated by the clock 70. Control then returns to block 104. Control continues to loop through blocks 104-118 until a reset event (e.g., an interrupt to enter a new model type, a power off, etc.) occurs (block 118). After a reset event (block 118), control returns to block 100.

Rather then employing a look-up table to set the thresholds and harmonic frequencies to test, it may be desirable to set the thresholds and select the harmonic frequencies based on the actual local media playback device 40 that is to be metered. To this end, a process for calibrating the local media mode meter 42 to the local media playback device 40 is shown in FIGS. 8A and 8B.

The process of FIGS. 8A-8B begins after the local media mode meter 42 has been connected to the output of the local media playback device 40. In the following example, the local media mode meter 42 is assumed to be a VCR coupled to a television, but other local media playback devices and/or media presentation devices may alternatively be employed. Once the local media mode meter 42 is attached to the local media playback device 40, the VCR is tuned to a channel and set to output the tuned signal via the output ports 6, 8 (block 200). The local media mode meter 42 then tunes and stores a set of frequencies output by the local media playback device 40 (block 202). The tuned frequencies lie above the video bandwidth of the tuned channel and including harmonics of the chrominance signal output by the local media playback device 40.

The VCR is then placed in an internally generated signal mode (e.g., a blue screen mode) (block 204). The local media mode meter 42 then tunes and stores a set of frequencies output by the local media playback device 40 (block 206). The tuned frequencies in the second set preferably correspond to the tuned frequencies in the first set.

A difference set is then computed by the processor 90 by subtracting the first set from the second set (block 208). The processor 90 then selects the three harmonic frequencies in the difference set that have the largest magnitude to be the harmonic frequencies that will be tuned to test the mode of the local media playback device 40 (block 210). The processor 90 then compares the magnitudes of the selected harmonic frequencies to a threshold to ensure the magnitude difference is sufficient to reliably distinguish the internally generated output signal (e.g., blue screen signals) from broadcast and other signals (e.g., tape playback, etc.) (block 212). If the differences are not large enough (block 212), an error has occurred and the process must be aborted (block 214), another channel is selected (block 215), and the process is repeated with the newly selected channel beginning at clock 200. If the differences are large enough (block 212), control advances to block 216.

At block 216, the processor 90 sets the thresholds for each of the harmonic frequencies. The processor 90 may set these thresholds by multiplying the magnitude of the corresponding harmonic as measured at block 206 by a fraction less than one (e.g., 50%, 75%). Once the thresholds are calculated and stored (block 218), the local media mode meter 42 is started to begin executing the program of FIG. 7. Control then advances to block 220 (FIG. 8B).

At block 220, the VCR is tuned to a channel to test if the local media mode meter 42 is properly functioning with the newly selected harmonic frequencies and thresholds. If the local media mode meter 42 indicates that the local media playback device 40 is outputting an internally generated signal (e.g., a blue screen signal) (block 222), an error has occurred (block 224). Accordingly, another channel is selected (block 226). Control then returns to block 200 and the calibration process is re-performed. If no error results (block 222), control advances to block 228.

At block 228, the VCR is placed into an internally generated signal mode such as a menu mode. If the local media mode meter 42 does not indicate that the local media playback device 40 is outputting an internally generated signal (e.g., a blue screen signal) (block 230), an error has occurred (block 224). Accordingly, another channel is selected (block 226). Control then returns to block 200 and the calibration process is re-performed. If no error results (block 230), the installation has been successful (block 232) and the process terminates.

From the foregoing, persons of ordinary skill in the art will appreciate that the above disclosed methods and apparatus have provided non-invasive techniques to detect when a local media playback device 40 such as a VCR is outputting an internally generated signal such as a blue screen signal. The process is "non-invasive" in that there is no need to open the housing of or tap into the internal circuitry of the local media playback device 40. Instead, all the needed data to monitor the local media playback device 40 may be obtained by connecting to one or more of the output ports 6, 8.

Although the above described methods and apparatus are particularly well suited for detecting internally generated signals output by VCRs, persons of ordinary skill in the art will appreciate that they may also be adapted for use with other local media playback devices such as DVD players, DVRs, PVRs, video games, and camcorders.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to detect an internally generated signal mode of a local media playback device, the apparatus comprising:
   a tuner to tune a harmonic frequency of a chrominance signal output by the local media playback device;
   a comparison circuit to compare the measured harmonic frequency to a predetermined threshold; and
   a memory to store a record indicating that the local media playback device is in the internally generated signal mode if the measured harmonic frequency exceeds the predetermined threshold, wherein the local media playback device comprises a video cassette recorder, a digital versatile disk player, a digital video recorder, a personal video recorder, a video game console, or a camcorder.

2. An apparatus as defined in claim 1 wherein the harmonic frequency is higher than a video bandwidth of a tuned channel.

3. An apparatus as defined in claim 1 wherein the harmonic frequency comprises a fifth to thirteenth harmonic of the chrominance signal.

4. An apparatus as defined in claim 1 wherein the tuner tunes to a first harmonic frequency of the chrominance signal output by the local media playback device and a second harmonic frequency of the chrominance signal output by the local media playback device.

5. An apparatus as defined in claim 4 wherein the comparison circuit compares the first measured harmonic frequency to a first predetermined threshold and the second measured harmonic frequency to a second predetermined threshold.

6. An apparatus as defined in claim 4 wherein the tuner tunes to a third harmonic frequency of the chrominance signal output by the local media playback device.

7. An apparatus as defined in claim 6 wherein the comparison circuit compares the first measured harmonic frequency to a first predetermined threshold, the second measured harmonic frequency to a second predetermined threshold, and the third measured harmonic frequency to a third predetermined threshold.

8. An apparatus as defined in claim 7 wherein the first predetermined threshold, the second predetermined threshold, and the third predetermined threshold are different from one another.

9. An apparatus as defined in claim 7 wherein the first harmonic frequency comprises a fifth harmonic frequency of the chrominance signal, the second harmonic frequency comprises a seventh harmonic frequency of the chrominance signal, and the third harmonic frequency comprises an eleventh harmonic frequency of the chrominance signal.

10. An apparatus as defined in claim 1 wherein the tuner comprises a signal level measuring circuit and a frequency select circuit.

11. An apparatus as defined in claim 10 wherein the signal level measuring circuit comprises an intermediate frequency detector and a received signal strength indicator.

12. An apparatus as defined in claim 10 wherein the frequency select circuit comprises a voltage controlled oscillator and a phase locked loop.

13. An apparatus as defined in claim 1 wherein the comparison circuit comprises a processor.

14. An apparatus as defined in claim 1 wherein the comparison circuit comprises:
a level comparator to compare the tuned harmonic frequency to the predetermined threshold; and
a control circuit to control the tuner.

15. An apparatus as defined in claim 14 wherein the comparison circuit further comprises:
a look-up table storing data identifying harmonic frequencies and predetermined thresholds to be used for predetermined models of local media playback devices; and
a clock to provide a time for time stamping the records stored in the memory.

16. An article of manufacture storing machine readable instructions which, when executed, cause a machine to:
tune a harmonic frequency of a chrominance signal output by the local media playback device; and
determine that the local media playback device is in the internally generated signal mode if the measured harmonic frequency exceeds a predetermined threshold.

17. An article of manufacture as defined in claim 16 wherein the harmonic frequency is higher than a video bandwidth of a tuned channel.

18. An article of manufacture as defined in claim 16 wherein the harmonic frequency comprises a fifth to thirteenth harmonic of the chrominance signal.

19. An article of manufacture as defined in claim 16 wherein the machine readable instructions cause the machine to tune a harmonic frequency by:
tuning a first harmonic frequency of the chrominance signal output by the local media playback device; and
tuning a second harmonic frequency of the chrominance signal output by the local media playback device.

20. An article of manufacture as defined in claim 19 wherein the machine readable instructions cause the machine to determine that the local media playback device is in the internally generated signal mode if the first measured harmonic frequency exceeds a first predetermined threshold and the second measured harmonic frequency exceeds a second predetermined threshold.

21. An apparatus to monitor use of a local media playback device comprising:
a tuner to tune a signal output by the local media playback device;
a control circuit to attempt to detect a characteristic unique to a blue screen video signal in an out of band portion of the signal output by the local media playback device; and
a memory to store a record indicating that the local media playback device is in a blue screen mode if the unique characteristic is detected.

22. An apparatus as defined in claim 21 wherein the signal output by the local media player comprises a chrominance signal.

23. An apparatus as defined in claim 21 wherein the unique characteristic comprises a trail of harmonic frequencies having a predetermined characteristic.

24. An apparatus as defined in claim 23 wherein the trail of harmonic frequencies comprise at least some harmonic frequencies of a chrominance signal.

25. An apparatus as defined in claim 24 wherein the at least some harmonic frequencies of the chrominance signal exceed a video bandwidth of a tuned channel.

26. An apparatus as defined in claim 24 wherein the predetermined characteristic comprises a set of thresholds corresponding to respective ones of the at least some harmonic frequencies.

* * * * *